J. H. OSBORNE.
COMPUTING CHEESE CUTTER.
APPLICATION FILED APR. 22, 1912.
1,131,949.
Patented Mar. 16, 1915.
2 SHEETS—SHEET 1.
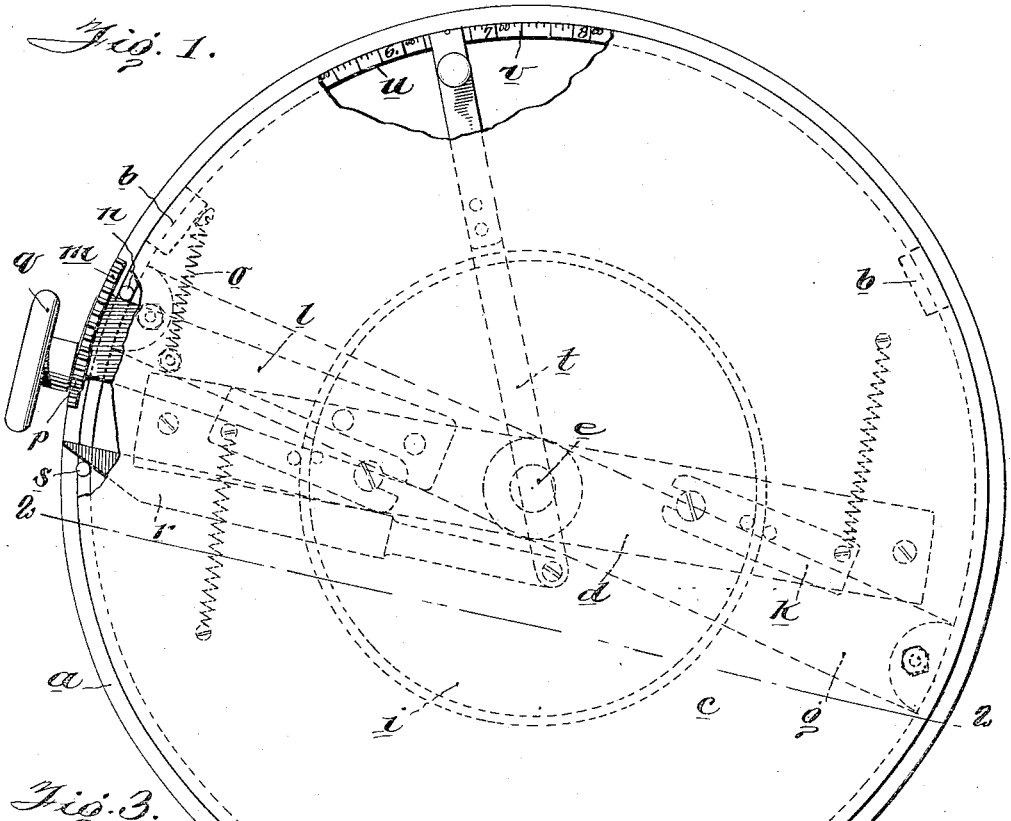
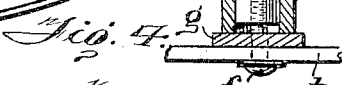
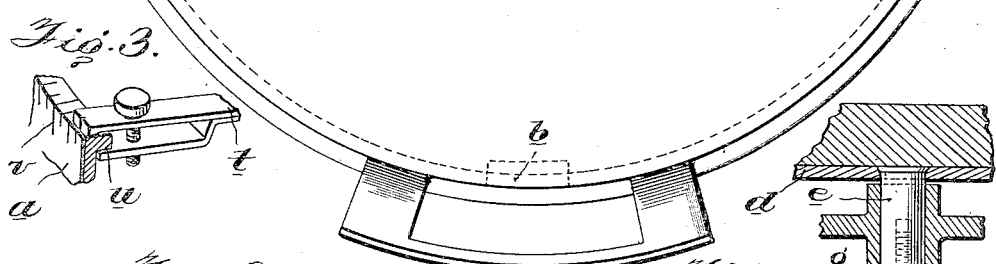
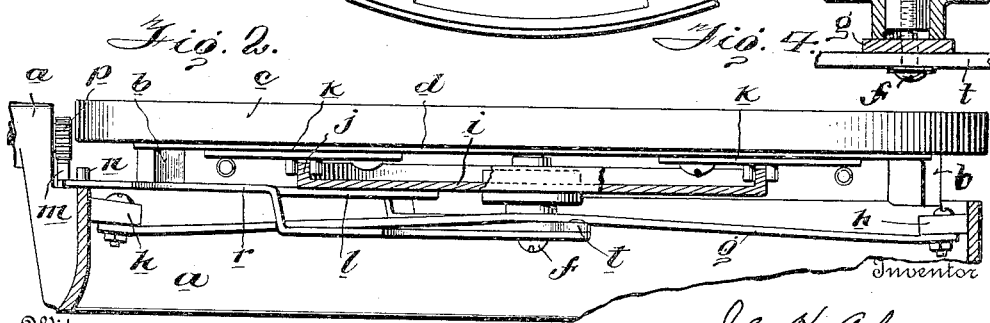

J. H. OSBORNE.
COMPUTING CHEESE CUTTER.
APPLICATION FILED APR. 22, 1912.
1,131,949.
Patented Mar. 16, 1915.
2 SHEETS—SHEET 2.
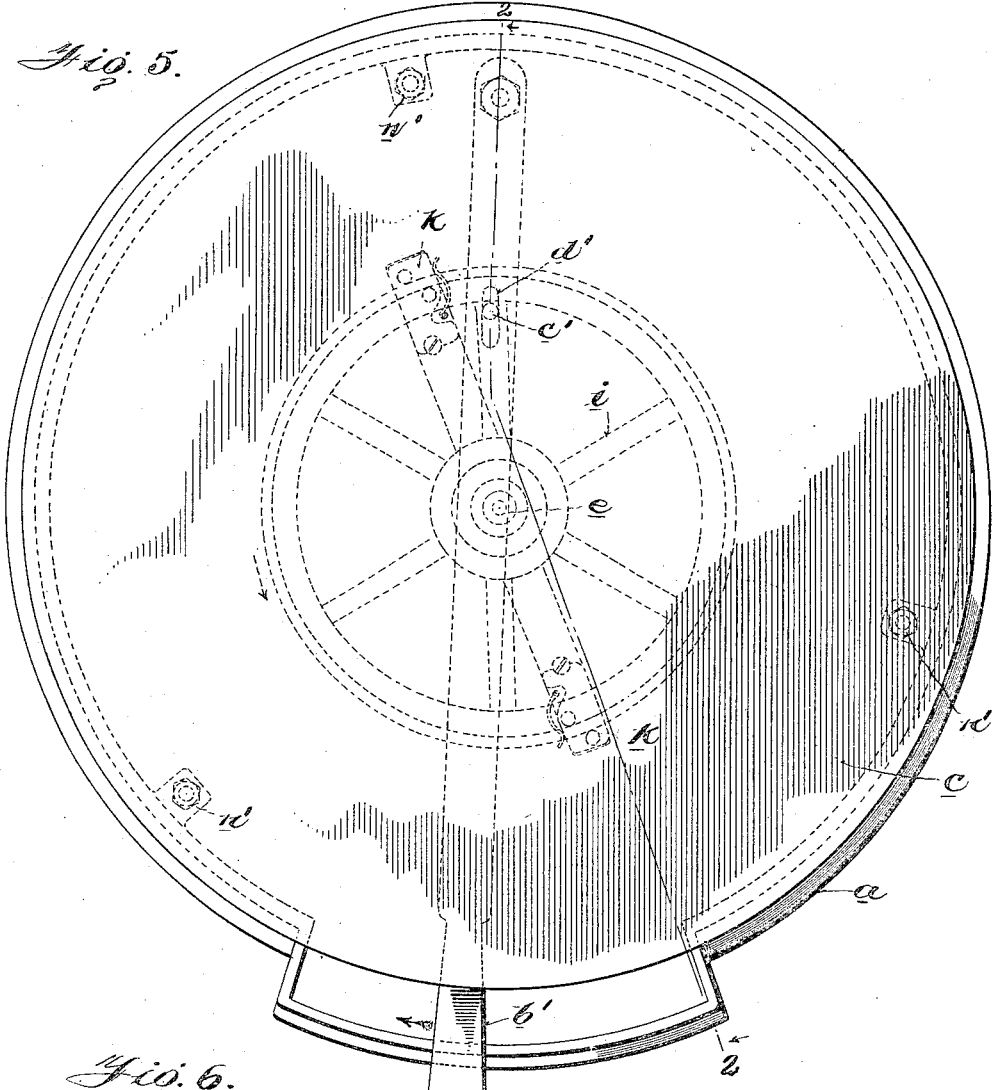
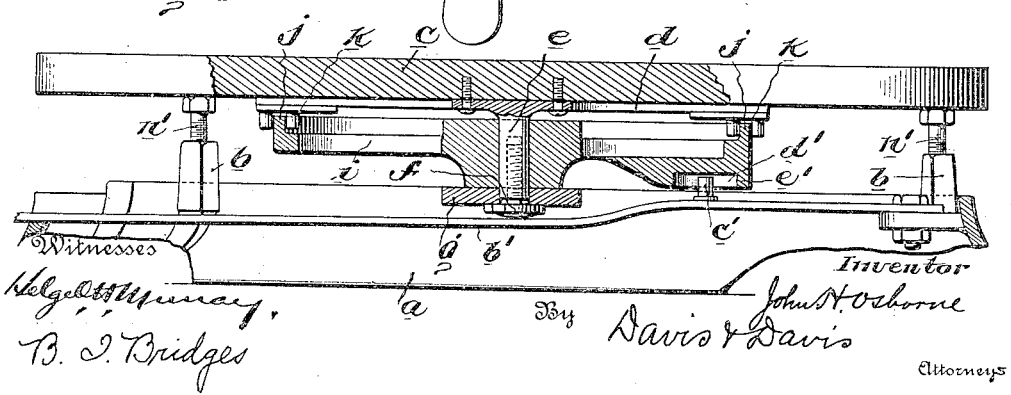

UNITED STATES PATENT OFFICE.

JOHN H. OSBORNE, OF ANDERSON, INDIANA.

COMPUTING CHEESE-CUTTER.

1,131,949.

Specification of Letters Patent.

Patented Mar. 16, 1915.

Application filed April 22, 1912. Serial No. 692,254.

*To all whom it may concern:*

Be it known that I, JOHN H. OSBORNE, a citizen of the United States, and a resident of Anderson, county of Madison, State of Indiana, have invented certain new and useful Improvements in Computing Cheese-Cutters, of which the following is a full and clear specification, reference being had to the accompanying drawings, in which—

Figure 1 is a plan view, the table or cheese board being broken away to show the scale device; Fig. 2 a vertical sectional view taken on the line 2—2 of Fig. 1; Figs. 3 and 4 detail views hereinafter described; Fig. 5 a plan view showing a slightly modified arrangement; Fig. 6 a vertical sectional view thereof.

The object of this invention is to improve and simplify the mechanism for intermittently rotating the cheese board predetermined measured distances, a special feature lying in the provision of means whereby the lines indicating the scale divisions may be spaced sufficiently far apart to greatly increase the accuracy of the machine and to minimize the bad results of improper setting of the scale lever by the retailer, as more fully hereinafter set forth.

In the drawing, $a$ designates a base of ring-like form, upon the upward extending lugs $b$ of which rests the cheese table $c$. Fastened rigidly to the under side of the cheese table is a plate or bar $d$ depending rigidly from which is a shaft $e$ mounted concentrically with respect to the table and the base. A clamp screw $f$ clamps the shaft or pivot $e$ down to a bar $g$ extending across the base and having its opposite ends rigidly clamped to lugs $h$ projecting inwardly therefrom, this bar $g$ being sufficiently springy to draw the cheese board with a resilient pressure down upon the lugs $b$.

Journaled on the pivot $e$, between the bar $g$ and the plate $d$, is a horizontal wheel $i$ having an upwardly extending flange $j$ around its edge. Normally engaging this annular flange $j$ is a pair of clutches $k$ carried by the cheese board through the medium of said plate $d$, these two clutches being arranged at diametrically opposite points. These clutches may be of any suitable construction which will adapt them to grip or clutch the wheel when the wheel is rotated in one direction and thus carry the cheese table with said wheel, and to release the wheel when rotated in the opposite direction to permit the wheel to return without rotating the cheese table back with it. An example of a suitable clutch for this purpose is shown in my former patent No. 797,599.

Fastened rigidly to the under side of the wheel $i$ is an arm $l$ which extends radially outward to a point beyond the cheese table, where it is provided on its upper side with a rack $m$. This arm is normally held against a stop pin $n$ on the base by a coil spring $o$, and to actuate the arm I provide a pinion $p$ attached to a shaft journaled on the base ring and provided at its outer end with a hand wheel $q$. The stop $n$ limits the movement of the radial arm in one direction, and to limit its movement in the other direction I provide an adjustable wedge-like bar $r$ whose tapered end bears against a stop $s$ on the base, the inner end of said bar $s$ being pivoted to the end of a lever $t$, this lever $t$ being pivoted concentrically with the table and wheel by being journaled on the clamp screw $f$. This lever $t$ extends radially outward to the base ring and is provided with means for clamping it at various points along an inwardly extending flange $u$ on the base ring. A suitable scale $v$ is provided on the base ring to determine the position of the lever. It will be observed that the nearer the clamped end of the lever is adjusted to the operating wheel $q$, the farther inwardly will be drawn the wedge $r$ and consequently the longer will be the stroke of the radial arm $l$, and vice versa; so that by the use of a suitable scale at $v$ the stop wedge $r$ may be readily adjusted to give the radial arm the desired throw.

It will be observed that when the radial arm swings or moves in the direction of the stop wedge $r$ the clutches will grip the ring or wheel $i$ and thus cause the cheese table to be turned therewith and when the operating wheel $q$ is released the spring $o$ will return the radial arm to initial position against stop $n$, the clutches being adapted to open on this return movement and thus avoid returning the cheese table. A slight frictional engagement of the table with the base is necessary in order to cause the clutches to thus open and permit the table to remain where it is moved to, and this friction is readily obtained by the slightly resilient bar $g$, whose normal tendency is to spring downwardly.

The scale $v$ may be a price scale or a weight scale, but whichever scale is employed it will be seen that the arrangement is such that widely spaced graduations may be employed, thus contributing materially to accuracy and to the minimizing of any mistakes that may be made by the retailer in setting the scale lever. This scale arrangement will be especially advantageous where a total value scale is employed. In the computing cheese cutters in which a total value scale is now employed, the figures and graduations used for the higher values are necessarily placed very close together, that spacing being so fine that nothing less than twenty-cent graduations can be used. With my mechanism, the spacing can be made so wide at this end of the scale that it is easy to provide for as small divisions as five-cent divisions, so that should the retailer set the scale lever on a mark adjacent to the correct one he will then only have gained or lost five cents upon or from the full value of the cheese.

In the modified construction shown in Figs. 5 and 6, the wheel $i$ is adapted to be oscillated by means of a vibratory lever $b'$, pivoted at one side of the base and provided with a pin $c'$ which slides in a slot or groove $d'$ formed in the under side of a lug $e'$ on the wheel. The vibration of this lever imparts to the wheel an oscillatory movement similar to that given to it by the rack and pinion heretofore described. In this construction any suitable scale and adjustable stop arrangement may be employed. In this modified form of the apparatus I have provided the base lugs $b$ with upstanding adjustable screws $n'$ whose heads are adapted to bear upon the under side of the cheese table. Devices similar to these may be employed, in connection with or in lieu of the spring bar $g$, to frictionally retard the return of the table. It will be observed that my invention is not confined to the specific features of construction shown in either form of the apparatus illustrated.

It will be observed that the scale illustrated in Fig. 1 is a total value scale. When this scale is employed the segments of cheese measured off at each stroke will have a predetermined value, usually five cents in practice.

Having thus described my invention, what I claim as new, and desire to secure by Letters Patent, is—

In a computing cheese cutter, the combination of a base, an oscillating wheel mounted on the base and provided with an upstanding clutch rim, means for oscillating said wheel variable distances, a cheese table rotatably mounted on the base, and means whereby said table will move with said wheel in one direction and will be held still when the wheel is oscillated in the opposite direction.

In testimony whereof I hereunto affix my signature in the presence of two witnesses.

JOHN H. OSBORNE.

Witnesses:
H. L. WOODRUFF,
JEANNETTE ZWIEKEL.

Copies of this patent may be obtained for five cents each, by addressing the "Commissioner of Patents, Washington, D. C."